US012633735B2

(12) United States Patent
Gao et al.

(10) Patent No.: US 12,633,735 B2
(45) Date of Patent: May 19, 2026

(54) METHOD FOR PROVIDING THERMAL PROTECTION TO A PRE-CHARGE UNIT AND ELECTRIC POWER CONVERSION SYSTEM FOR EXECUTING THE METHOD

(71) Applicant: Danfoss Power Electronics A/S, Gråsten (DK)

(72) Inventors: Zhi Gao, Chapel Hill, NC (US); Stefan Schroeder, Munich (DE); Markus Sjoblom, Holly Springs, NC (US); Kenneth Dean, Ooltewah, TN (US)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 197 days.

(21) Appl. No.: 18/416,451

(22) Filed: Jan. 18, 2024

(65) Prior Publication Data

US 2024/0250517 A1 Jul. 25, 2024

(30) Foreign Application Priority Data

Jan. 25, 2023 (DE) .......................... 102023101791.8

(51) Int. Cl.
H02H 5/04 (2006.01)
H02M 7/537 (2006.01)
H02M 7/00 (2006.01)

(52) U.S. Cl.
CPC ............ H02H 5/047 (2013.01); H02M 7/537 (2013.01); H02M 7/003 (2013.01)

(58) Field of Classification Search
CPC ............ H02H 5/047; H02H 5/04; H02H 6/00; H02M 7/537; H02M 7/003; H02M 7/068
See application file for complete search history.

(56) References Cited

U.S. PATENT DOCUMENTS

| | | | | |
|---|---|---|---|---|
| 2009/0284305 A1* | 11/2009 | Pelz | ................... | H03K 17/0822 |
| | | | | 327/518 |
| 2011/0084548 A1* | 4/2011 | Gale | ....................... | B60L 53/18 |
| | | | | 307/9.1 |
| 2018/0053636 A1* | 2/2018 | Criminale | ............... | H01L 22/20 |
| 2019/0137552 A1* | 5/2019 | Andle | .................... | G01R 21/14 |
| 2020/0389030 A1* | 12/2020 | Porter | .................. | H02J 3/1807 |
| 2025/0260336 A1* | 8/2025 | Schroeder | ............... | H02M 7/23 |

FOREIGN PATENT DOCUMENTS

| | | |
|---|---|---|
| DE | 102009003206 A1 | 12/2009 |
| DE | 102010037415 A1 | 4/2011 |
| DE | 112018005230 T5 | 6/2020 |

* cited by examiner

*Primary Examiner* — Sisay G Tiku
(74) *Attorney, Agent, or Firm* — McCormick, Paulding & Huber PLLC

(57) ABSTRACT

A method for providing thermal protection for a pre-charge unit (PRC) in an electric power conversion system, such as a medium-voltage adjustable-speed drive with a step-up transformer and DC link. The method includes identifying the electrical and thermal parameters of the PRC, estimating the current through the step-up transformer of the PRC based on input voltage, and estimating the thermal level of the transformer from the current. A protection logic then compares the estimated thermal level to a pre-determined trip threshold and outputs a trip signal if the threshold is exceeded. The disclosure also covers an electric power conversion system configured to perform this thermal protection method.

19 Claims, 6 Drawing Sheets

METHOD FOR PROVIDING THERMAL PROTECTION TO A PRE-CHARGE UNIT AND ELECTRIC POWER CONVERSION SYSTEM FOR EXECUTING THE METHOD

CROSS-REFERENCE TO RELATED APPLICATION

This application claims foreign priority benefits under 35 U.S.C. § 119 from European Patent Application No. 102023101791.8, filed Jan. 25, 2023, the content of which is hereby incorporated by reference in its entirety.

TECHNICAL FIELD

The present invention pertains to a method for providing thermal protection to a pre-charge unit (PRC) comprising a step-up transformer of an electric power conversion system, such as a medium-voltage adjustable-speed drive having e.g. 3300V or 4160V output voltage and typical power ratings between 1 and 10 MW, with a DC link. The method comprises the steps of executing a parameter identification block, identifying the electrical and thermal parameters of the PRC; of an electric power conversion system executing a current estimation block estimating the current flowing through the PRC's step-up transformer based on a voltage input;

executing a thermal level estimation block, estimating a thermal level at the PRC's step-up transformer based on the estimated current flowing through the PRC's step-up transformer;

executing a protection logic block, comparing the estimated thermal level to a pre-determined trip threshold to determine whether a thermal overload has occurred; and outputting a trip signal if the trip threshold has been exceeded.

The invention is also directed at an electric power conversion system, such as a medium-voltage adjustable-speed drive, with a pre-charge unit (PRC) including a step-up transformer and a DC link for executing a corresponding method.

BACKGROUND

Methods for providing thermal protection for pre-charge units of electric power conversion systems are known from the art. Prior art solutions typically require dedicated and often expensive current sensors, as well as associated electronic hardware that is capable of acquiring and sampling current sensor output waveforms at a sampling frequency of at least a few kilohertz. The prior art solutions also require fast digital signal processing hardware, capable of processing sampled currents at least every few hundred microseconds. A problem of the hardware of known prior art solutions is therefore that it comprises costly components, which results in overall expensive power conversion systems.

SUMMARY

The aim of the present invention is to provide an improved method for providing thermal protection to a pre-charge unit of an electric power conversion system and an improved electric power conversion system, which overcome this problem.

This aim is reached by a method according to claim 1 and a device according to claim 11. Preferable embodiments are subject to the dependent claims.

According to claim 1, a method for providing thermal protection to a pre-charge unit (PRC) comprising a step-up transformer of an electric power conversion system is provided. The electric power conversion system may be a medium-voltage adjustable-speed drive, with a DC link. The method comprises the steps of executing a parameter identification block, identifying the electrical and thermal parameters of the PRC;

executing a current estimation block, estimating the current flowing through the PRC's step-up transformer based on a voltage input;

executing a thermal level estimation block, estimating a thermal level at the PRC's step-up transformer based on the estimated current flowing through the PRC's step-up transformer;

executing a protection logic block, comparing the estimated thermal level to a pre-determined trip threshold to determine whether a thermal overload has occurred; and outputting a trip signal if the trip threshold has been exceeded.

The invention makes a novel and cost-effective use of existing voltage sensors to estimate currents flowing through a PRC. The estimated current is used for providing thermal overload protection against overheating. Compared to conventional thermal overload protection, which relies on dedicated current sensing and fast digital signal processing, this invention eliminates the need for potentially expensive current sensors and fast digital signal processors. The invention reduces the digital signal processing bandwidth requirement by a few orders of magnitude.

In a preferred embodiment of the invention, the parameter identification block takes a voltage selection board rating $V_{SB}$, a low-voltage AC power supply's nominal voltage $V_1$ in root-mean-square Volts and/or a low-voltage AC power supply's nominal frequency $f_e$ in Hz as its input. The method offers different ways for providing thermal protection, as it may be carried out using different voltage inputs.

In another preferred embodiment of the invention, the parameter identification block produces the step-up transformer's ratio $N_2/N_1$, the step-up transformer's low-voltage winding resistance $R_1$ in $\Omega$, the step-up transformer's medium-voltage winding resistance $R_2$ in $\Omega$, the step-up transformer's heat-up thermal time constant $\tau_{th,H}$ in seconds and/or the step-up transformer's cool-down thermal time constant $\tau_{th,C}$ in seconds as its output.

In another preferred embodiment of the invention, the parameter identification block is executed once and/or the current estimation block and/or the thermal level estimation block and/or the protection logic block are executed at fixed time intervals, at different time intervals and/or at varying time intervals.

In another preferred embodiment of the invention, the current estimation block and/or the thermal level estimation block and/or the protection logic block are executed at time intervals that are longer than the time period of the supply frequency, preferably at time intervals of 25 ms, 50 ms, 100 ms, 200 ms or 500 ms. The time intervals are not limited to the examples but may also be other intervals. This time interval may be an already existing update rate of a control unit of the power conversion system.

In another preferred embodiment of the invention, the current estimation block estimates the current flowing through the PRC's step-up transformer based on $V_{DC}$ voltage measurements at the DC link.

In another preferred embodiment of the invention, the current estimation block calculates an amplitude modulation ratio $m_a$ from measured $V_{DC}$ and the highest peak voltage $V_P$.

In another preferred embodiment of the invention, the current estimation block calculates an RMS current from equation (14)

$$I_1 = k_{th} \cdot I_{MQ,RMS} \cdot \frac{N_2}{N_1},$$

wherein $I_{MQ,RMS}$ is the RMS current flowing through diodes $D_5$ and $D_6$ of the PRC diode rectifier assembly derived from equation (13)

$$I_{MQ,RMS} = \frac{V_{MQ,RMS}}{R_1' + R_2},$$

wherein $V_{MQ,RMS}$ is the RMS voltage across diodes $D_5$ and $D_6$ of the PRC diode rectifier assembly derived from equation (12)

$$\eta = \frac{V_{MQ,RMS}^2}{V_P^2} = \frac{1}{\pi} \cdot \left[ (\pi - 2\alpha)\left(1 - \frac{\cos(2\alpha)}{2}\right) - \frac{3}{2}\sin(2\alpha) \right],$$

and wherein the diode's turn-on angle $\alpha$ and the conversion ratio n are derived from a look-up table relating $\alpha$ and $\eta$ to the amplitude modulation ratio $m_a$.

In another preferred embodiment of the invention, the only sensor used for executing the method is a voltage sensor. The only sensor may be understood to refer to one or more voltage sensors. The voltage sensor may be an electronic circuitry to read a precise voltage level.

In another preferred embodiment of the invention, the trip threshold is pre-determined prior to the execution of the method and/or the parameter identification block is executed once at the beginning of the method.

The invention is also directed at an electric power conversion system, such as a medium-voltage adjustable-speed drive, with a pre-charge unit (PRC) including a step-up transformer and a DC link for executing the presently described method.

BRIEF DESCRIPTION OF THE DRAWINGS

Further details and advantages of the invention are described with reference to the figures. The figures show.

DETAILED DESCRIPTION

The present invention relates to the thermal protection of pre-charge units (PRCs) without using current or temperature sensors. More specifically, the present invention relates to the continuous estimation of the thermal level or thermal load, wherein only voltage measurements are considered. The PRCs may be protected particularly when operating at either heat-up or cool-down conditions.

Medium-voltage adjustable-speed drives and other power conversion systems are typically used with PRCs. The PRCs take an auxiliary low-voltage AC power supply input, such as 240 V, 440 V or 480 V, and produces a DC output. For medium-voltage adjustable-speed drives, the DC output is a medium-voltage DC output. The DC output energizes a DC link to a pre-determined voltage threshold prior to its connection to a main medium-voltage power supply. This helps reduce the inrush current from the main power supply at the time of connection.

The present invention provides a comprehensive thermal overload protection function for pre-charging units, in particular for medium-voltage drives without increasing the drive's manufacturing cost. Compared to conventional thermal overload protection, which relies on dedicated current sensing, the present invention eliminates the need for such current sensors. Instead, it relies on measurements from an existing medium-voltage DC link voltage sensor. The invention further reduces the digital signal processing bandwidth requirement. Instead of computing a root mean square (RMS) current value every few hundred microseconds, this invention reduces the digital signal processing's bandwidth requirement by computing RMS current say every 100 milliseconds for thermal overload protection purpose. Computing the RMS current is not limited to be made every 100 milliseconds but may also be other intervals.

Figure 1:
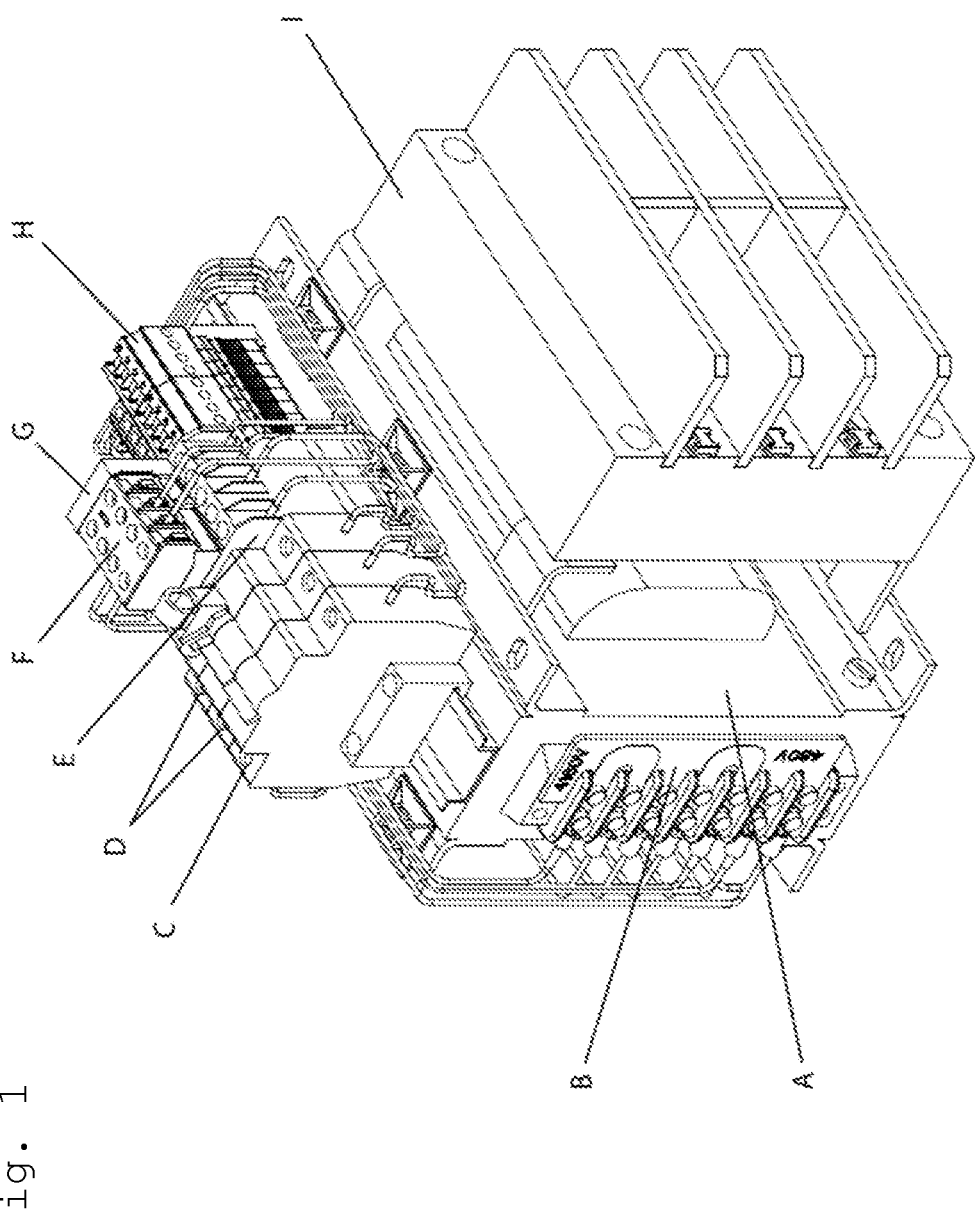
FIG. 1: components of a pre-charge unit.

FIG. 1 shows a PRC with its components for a medium-voltage adjustable-speed drive. Major components in the PRC are the step-up transformer A, the voltage selection board B, the shunt trip breaker C, the LV breaker D, the contactor for 24 V DC control E, the auxiliary block for contactors F, the snubber block for contactors G, the contactor assembly for control wiring H and the diode rectifier assembly I. When the PRC operates to energize the medium-voltage DC link, a significant amount of current flows through the step-up transformer A within a short duration. The current consequently produces a large amount of heat in the step-up transformer's A windings.

For the PRC's components shown in FIG. 1, the step-up transformer's A windings have a temperature limit determined by the windings' thermal class. The step-up transformer's A windings are the most vulnerable components to overheating. The thermal protection is focused on providing protection for the step-up transformer's A windings against overheating above the temperature limit determined by the thermal class. For example, a step-up transformer class 105 insulation class A may have a maximum winding temperature of 105° C.

Conventional microprocessor-based thermal protection requires often dedicated current sensors installed on the transformer's primary side. In addition, for low-voltage AC power supply input at 50 or 60 Hz, the thermal protection requires non-trivial electronic circuitry that samples current sensors' outputs at a few thousand samples per second. The microprocessor then performs calculations every few hundred microseconds based on the sampled current I and the sampling time interval t. This $I^2t$ value is subsequently compared to a pre-defined trip curve and drive thermal protection logic.

Figure 2:
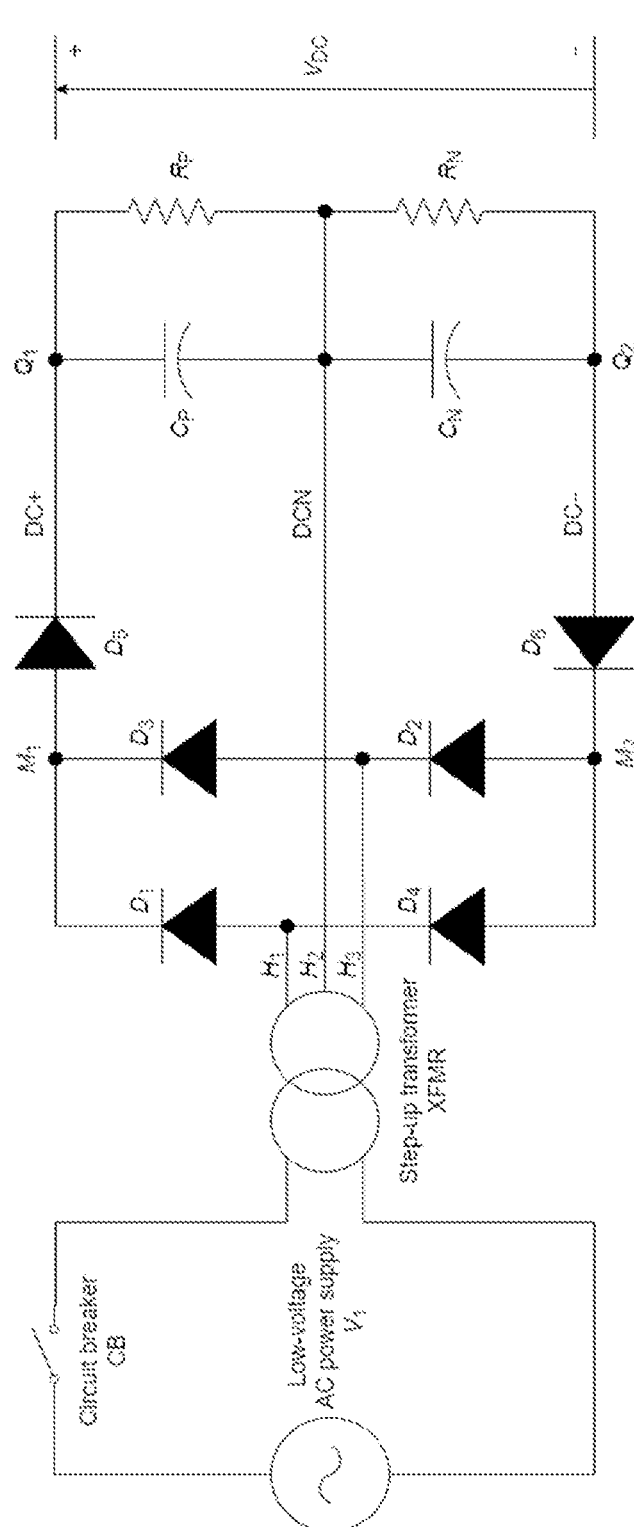
FIG. 2: pre-charge unit's circuit diagram.

FIG. 2 shows the circuit diagram of a medium-voltage drive's pre-charge unit and its connected components. The low-voltage AC power supply $V_1$ supplies AC power through a circuit breaker CB to the pre-charge unit's step-up transformer XFMR. The step-up transformer then produces a medium-voltage AC voltage at its output terminals $H_1$, $H_2$ and $H_3$. A diode rectifier assembly, which consists of six diodes $D_1$ through $D_6$, subsequently converts the medium-voltage AC voltage to medium-voltage DC voltage. The DC link capacitor $C_P$ is connected between the DC link's positive bus DC+ and the DC link's neutral bus DCN. The other DC link capacitor $C_N$ is connected between the DC link's neutral bus DCN and the DC link's negative bus DC−. The resistors $R_P$ and $R_N$ help balance voltages during the medium-voltage drive's normal operation. They also help discharge capacitors $C_P$, $C_N$ once the medium-voltage drive is powered off.

The nominal ratings of DC link capacitors $C_P$ and $C_N$ are usually designed to be identical. The nominal ratings of DC link resistors $R_P$ and $R_N$ are designed to be identical as well. All diodes $D_1$ through $D_6$ have the same nominal ratings. The resistance and inductance values between $H_1$ and $H_2$ differ from those between $H_2$ and $H_3$ by a few percentage points. Consequently, there is no significant amount of current flowing through the DC link's neutral bus DCN at the time of pre-charging, assuming the leakage current of $C_P$ and $C_N$ is equal or insignificant.

In accordance with a preferred embodiment of the invention, a method and apparatus to provide continuous and reliable thermal protection to PRCs against overheating are provided. The protection is based on voltage measurements readily available at the DC link in adjustable-speed drives or other power conversion systems. Continuous protection is provided for PRCs during heat-up and/or cool-down conditions. No additional current or temperature sensors are needed. Furthermore, the invention does not require a microprocessor to perform calculations every few hundred microseconds. According to the present invention, the microprocessor performs calculations at a much slower pace of e.g. every few hundred milliseconds. The microprocessor may also be a microcontroller or FPGA device, which may execute codes or functions.

The presently described method can be divided into 4 major steps.

In a first step, a parameter identification block may be executed once. The parameter identification block identifies the PRC's electrical and thermal parameters.

In a second step, a current estimation block may be executed at a fixed time interval. The current estimation block estimates the current flowing through the PRC's step-up transformer.

In a third step, a thermal level estimation block takes the estimated current as its input. The thermal level estimation block then produces an estimated thermal level, preferably at the same fixed time interval as its output.

In a fourth step, a protection logic block compares the estimated thermal level to a pre-determined trip threshold to determine whether a thermal overload has occurred. The protection logic block then generates a trip signal accordingly.

The disclosed method and apparatus may be used for PRCs with transformers in medium-voltage adjustable-speed drives or other power conversion systems.

Figure 3:
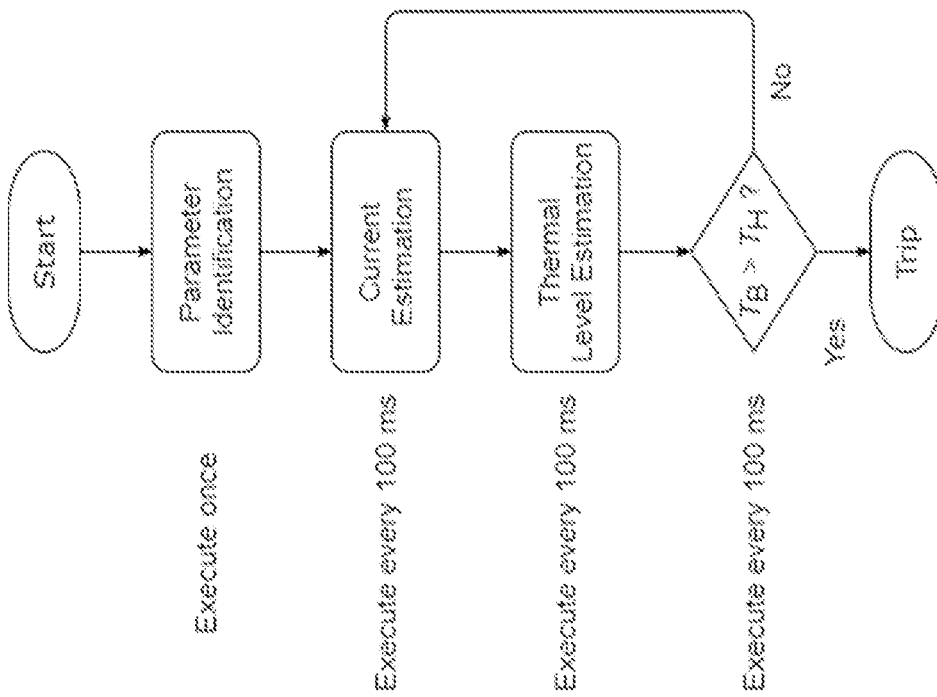
FIG. 3: overall architecture of the pre-charge unit's thermal protection algorithm.

FIG. 3 shows an overall architecture of the PRC's thermal protection algorithm. The protection is based on voltage measurements readily available at the DC link in adjustable-speed drives or other power conversion systems.

The parameter identification block may be executed once. It identifies the PRC's electrical and thermal parameters. The current estimation block may be executed every e.g. 100 ms during the PRC's operation. It estimates the current flowing through the step-up transformer. The estimated current feeds into the thermal level estimation block. This block may be executed every e.g. 100 ms during the PRC's operation. It produces an estimated thermal level $T_B$ at its output. The estimated thermal level $T_B$ is subsequently compared to a preset thermal threshold $T_H$ to determine whether a thermal overload has occurred, and a trip signal is generated accordingly.

Compared to conventional microprocessor-based thermal protection, continuous thermal protection is provided using already existing DC link voltage measurement without involving additional current or temperature sensors. Furthermore, the invention does not require the microprocessor to perform calculations every few hundred microseconds. Instead, the microprocessor performs calculations at a much slower pace of every few hundred milliseconds. In the presently described invention, the calculation may further be simplified through a pre-computed look-up table.

The parameter identification block may be executed once. The input to this identification block may come from a selected database entry or may be manually entered or modified by the user. It may take the following input voltage selection board rating $V_{SB}$ (240 V, or 440 V or 480 V)

low-voltage AC power supply's nominal voltage $V_1$ in root-mean-square (RMS) Volts low-voltage AC power supply's nominal frequency $f_e$ in Hz and may produce the following electrical parameters at its output step-up transformer's ratio $N_2/N_1$ step-up transformer's low-voltage winding resistance $R_1$ in $\Omega$ step-up transformer's medium-voltage winding resistance $R_2$ in $\Omega$ The parameter identification block may also produce the following thermal parameters at its output step-up transformer's heat-up thermal time constant $\tau_{th,H}$ in seconds step-up transformer's cool-down thermal time constant $\tau_{th,C}$ in seconds The output parameters may be calculated using the input parameter or taken from a look-up table.

In addition, the parameter identification block may use the following intermediate quantities internally for its calculation step-up transformer's VA rating S in V·A For the low-voltage AC power supply's nominal voltage $V_1$, equation (1) describes its relationship to the voltage selection board rating $V_{SB}$. In the absence of any user input, $V_1$ is usually the same as $V_{SB}$. However, it is also possible that an end user specifies a value for $V_1$ that is less than $V_{SB}$.

$$V_1 = \begin{cases} V_{SB} & \text{Normal case} \\ \text{User input} & \text{Special case} \end{cases} \quad (1)$$

For example, a customer may specify $V_{SB}$=440 V, and due to application limitation may use a 230 V power supply to charge the medium-voltage DC link. In this case, $V_1$=230 V.

Figures 4A, 4B:
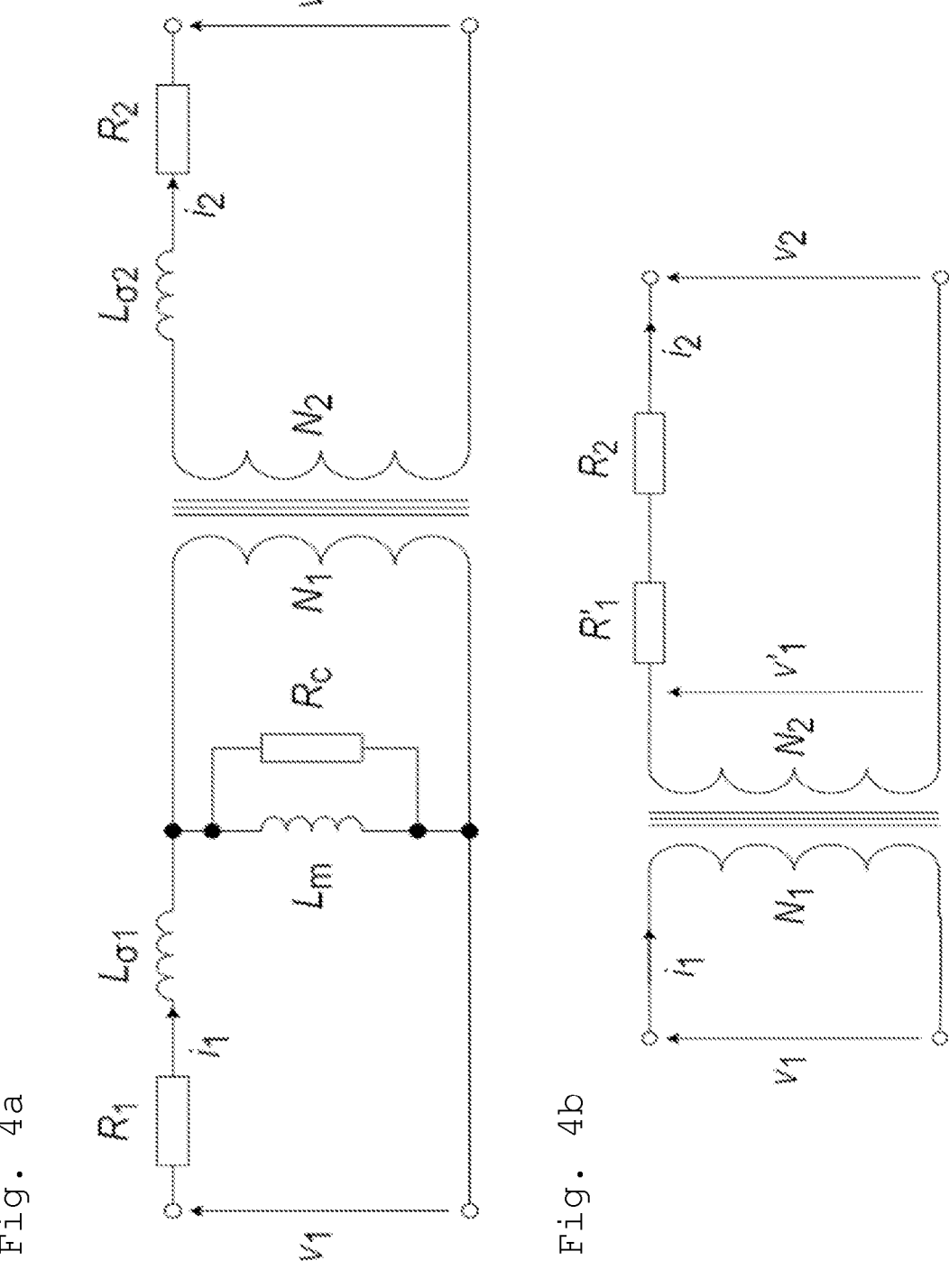
FIG. 4a: step-up transformer's standard equivalent circuit.
FIG. 4b: step-up transformer's simplified equivalent circuit.

FIG. 4a shows a standard equivalent circuit of the step-up transformer. In FIG. 4a, $N_1$ and $N_2$ are the number of turns in low- and medium-voltage windings, respectively. $R_1$ and $R_2$ are the low- and medium-voltage winding's resistances, respectively. $L_{\sigma1}$ and $L_{\sigma2}$ are the low- and medium-voltage winding's leakage inductances, respectively. $L_m$ is the step-up transformer's magnetizing inductance, and $R_e$ represents the step-up transformer's core losses.

Table 1 summarizes exemplar electrical parameters for a step-up transformer for the standard equivalent circuit shown in FIG. 4a. Those electrical parameters can be obtained through a series of tests.

TABLE 1

| Step-up transformer parameters | | | | | | | |
| --- | --- | --- | --- | --- | --- | --- | --- |
| $V_{SB}$ (V) | $N_2/N_1$ | $R_1$ ($\Omega$) | $L_{\sigma 1}$(mH) | $R_2$ ($\Omega$) | $L_{\sigma 2}$ (mH) | $R_c$ ($\Omega$) | $L_m$ (H) |
| 240 | 26.53 | 1.98 | 0.97 | 2327.1 | 1197.8 | 4377.7 | 26.3 |
| 440 | 14.42 | 6.25 | 3.63 | 2327.1 | 1197.8 | 14364.0 | 71.6 |
| 480 | 13.22 | 7.97 | 3.80 | 2327.1 | 1197.8 | 16376.0 | 84.3 |

It is apparent that the step-up transformer's magnetizing inductance $L_m$ is several orders of magnitude larger than the low-voltage winding's leakage inductance $L_{\sigma 1}$. The step-up transformer's magnetizing inductance $L_m$ is also several orders of magnitude larger than the medium-voltage winding's leakage inductance $L_{\sigma 2}$ when it is referred to the step-up transformer's low-voltage side. Therefore, for the thermal protection purpose, the magnetizing inductance $L_m$ may be neglected without introducing significant error in calculating the low-voltage current $i_1$.

Similarly, the step-up transformer's core loss resistor $R_e$ is several orders of magnitude larger than the low-voltage winding's resistances $R_1$. The step-up transformer's core loss resistor $R_c$ is also several orders of magnitude larger than the medium-voltage winding's resistance $R_2$ when it is referred to the step-up transformer's low-voltage side. Therefore, for the thermal protection purpose, the core loss resistor $R_c$ may be neglected without introducing significant error in calculating the low-voltage current $i_1$.

Furthermore, for any voltage selection board $V_{SB}$ at 50 or 60 Hz, the low-voltage winding's resistance $R_1$ is 3 to 4 times larger than the equivalent reactance of the low-voltage winding's leakage inductance $L_{\sigma 1}$. The medium-voltage winding's resistance $R_2$ is also about 4 times larger than the equivalent reactance of the medium-voltage winding's leakage inductance $L_{\sigma 2}$. Consequently, the overall low-voltage winding impedance is mostly resistive, and the overall medium-voltage winding impedance is mostly resistive as well. Therefore, for the thermal protection purpose, both the low-voltage winding's leakage inductance $L_{\sigma 1}$ and the medium-voltage winding's leakage inductance $L_{\sigma 2}$ may be neglected without introducing significant error in calculating the low-voltage current $i_1$.

As a result, the step-up transformer's standard equivalent circuit shown in FIG. 4a is reduced to a simplified equivalent circuit shown in FIG. 4b. Note that $R'_1$(in $\Omega$) is the low-voltage winding's resistance $R_1$ referred to the medium-voltage side via the following $$R'_1 = R_1 \left(\frac{N_2}{N_1}\right)^2 \tag{2}$$

Figure 5:
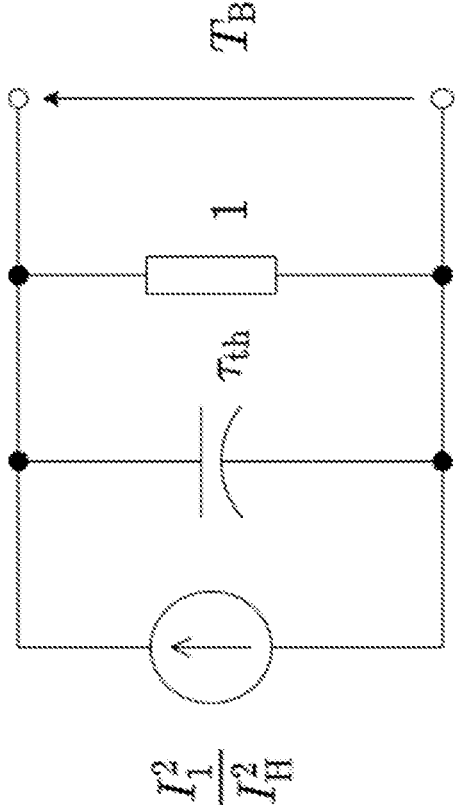
FIG. 5: first-order thermal model.

The thermal protection for the step-up transformer is described by a first-order thermal model shown in FIG. 5. In FIG. 5, The $I_1$ (in Amps) is the RMS current in the step-up transformer's low-voltage winding. The $\tau_{th}$ (in seconds) is the step-up transformer's the thermal time constant. The $T_B$ is the step-up transformer's thermal level above its ambient. The first-order thermal model in FIG. 5 is characterized by the following equation $$\tau_{th}\frac{dT_B}{dt} + T_B = \frac{I_1^2}{I_H^2} \tag{3}$$

When implementing the thermal protection digitally in a microprocessor, equation (3) is transformed from continuous- to discrete-time domain $$\tau_{th} \cdot \frac{T_B(n) - T_B(n-1)}{\Delta t} + T_B(n) = \frac{I_1^2}{I_H^2} \tag{4}$$

where n is the discrete-time index, and $\Delta t$ (in seconds) is the time interval between discrete-time indices n and n−1. Rewriting equation (4) yields $$T_B(n) = \frac{\tau_{th}}{\tau_{th} + \Delta t} \cdot T_B(n-1) + \frac{\Delta t}{\tau_{th} + \Delta t} \cdot \frac{I_1^2}{I_H^2} \tag{5}$$

Equation (5) is the foundation of thermal level estimation block shown in FIG. 3.

When the PRC operates to energize the medium-voltage DC link, the current estimation block executes every e.g. 100 ms, and estimates the current flowing through the step-up transformer. It takes the measured medium-voltage DC link's voltage $V_{DC}$ as its input, and outputs an estimate of the RMS current in the step-up transformer's low-voltage winding $I_1$. To reduce the total number of computations, the current estimation block may also output $I^2_1$ in lieu of $I_1$.

The current estimation block is formulated in three steps. First, it calculates a rectified voltage from the low-voltage AC power supply, i.e. the absolute value of the voltage at each moment in time. Second, it calculates a differential voltage from the rectified voltage. Last, it computes the RMS current in the step-up transformer's low-voltage winding from the differential voltage.

According to the simplified equivalent circuit in FIG. 4b, the step-up transformer boosts the low-voltage AC voltage vi to a medium-voltage AC voltage $v'_1$ $$v'_1 = v_1 \cdot \frac{N_2}{N_1} \tag{6}$$

Neglecting the forward voltage drop across diodes in FIG. 2, the diodes $D_1$ through $D_4$ in the full-bridge diode rectifier assembly convert the medium-voltage AC $v'_1$ to a rectified voltage $v'_{1R}$ between $M_1$ and $M_2$. Denotes the peak amplitude of the rectified voltage $v'_{1R}$ as $V_P$.

Figure 6:
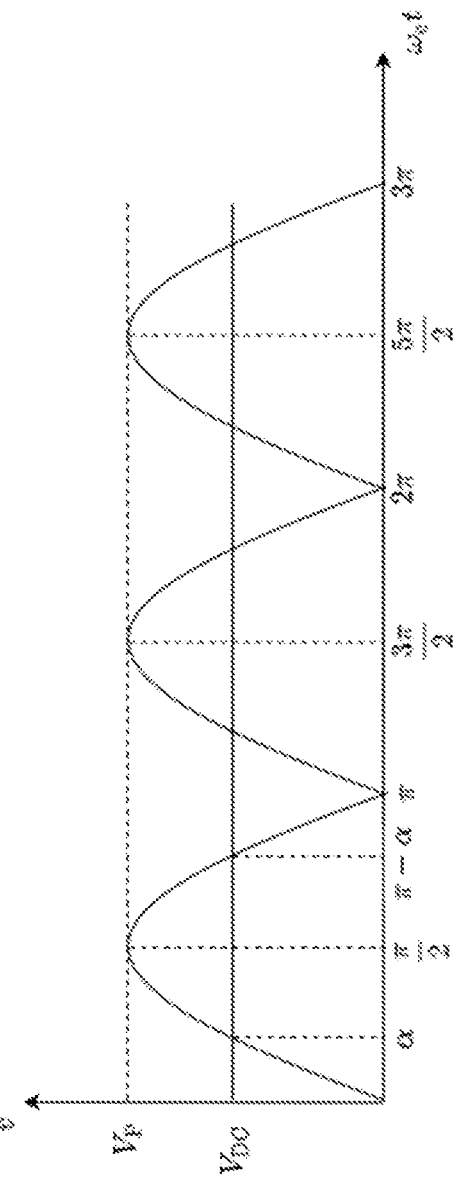
FIG. 6: rectified voltage and differential voltage waveforms in pre-charge unit's circuit diagram.

FIG. 6 shows the waveform of the rectified voltage v'IR. Note that de (in radians per second) is the low-voltage AC power supply's nominal angular frequency. It is related to the low-voltage AC power supply's nominal frequency $f_e$ via $\omega_e = 2\pi f_e$.

According to various standards, the low-voltage AC voltage vi is allowed to fluctuate between −10% and +10% around its nominal voltage $V_1$. Therefore, the highest peak voltage $V_P$ is $$V_P = 110\% \cdot \sqrt{2} \cdot V_1 \cdot \frac{N_2}{N_1} \qquad (7)$$

Consequently, the rectified voltage is $$v'_{1R} = V_P |\sin(\omega_e t)|| \qquad (8)$$

As shown in FIG. 6 and by equation (8), the rectified voltage $v'_{1R}$ repeats every $\pi$ radians with respect to wet. Therefore, subsequent analysis is focused on $\omega_e t$ between 0 and $\pi$ by taking advantage of this periodicity.

Referring to FIG. 2, the voltage between $M_1$ and $M_2$ is the rectified voltage $v'_{1R}$. The voltage between $Q_1$ and $Q_2$ is the medium-voltage DC link's voltage $V_{DC}$. Therefore, the differential voltage $v_{MQ}$ is defined as the difference between the rectified voltage v'IR and the medium-voltage DC link's voltage $V_{DC}$ when the diodes $D_5$ and $D_6$ are conducting, and 0 elsewhere.

FIG. 6 shows the waveform of medium-voltage DC link's voltage $V_{DC}$ superimposed on that of the rectified voltage v'IR. Assuming ideal diodes $D_5$ and $D_6$ with no forward voltage drop, and defining $m_a$ as the amplitude modulation ratio, i.e., $m_a = V_{DC}/V_P$, the differential voltage $V_{MQ}$ is $$v_{MQ}(t) = \begin{cases} 0 & 0 \le \omega_e t < \alpha \\ V_P[\sin(\omega_e t) - m_a] & \alpha \le \omega_e t \le \pi - \alpha \\ 0 & \pi - \alpha < \omega_e t \le \pi \end{cases} \qquad (9)$$

According to FIG. 6, the amplitude modulation ratio $m_a$ is also related to the diode's turn-on angle $\alpha$ via $m_a = \sin(a)$. It is apparent that $0 \le \alpha \le \pi/2$, and $0 \le m_a \le 1$.

It is worth noting that in medium-voltage drive, both $V_P$ and $V_{DC}$ are in kV range. They are far greater than the diode's forward voltage drop $V_f$. Therefore, the diode's forward voltage drop $V_f$ may be neglected without introducing significant amount of error in subsequent calculations.

The RMS current calculation computes an equivalent RMS current in the step-up transformer's low-voltage winding from the differential voltage. To start with, when the rectifier diode's on resistance is neglected, the instantaneous current that flows through the diodes $D_5$ and $D_6$ is $$i_{MQ}(t) = \frac{v_{MQ}(t)}{R'_1 + R_2} \qquad (10)$$

The diode's on resistance is neglected because it is small compared to the resistance quantity $R'_1 + R_2$.

The RMS current of $i_{MQ}(t)$ is calculated by first calculating the square of the RMS voltage of $v_{MQ}(t)$ first, and then taking the square root of the result. The square of the RMS voltage of $v_{MQ}(t)$ is calculated via $$V_{MQ,RMS}^2 = \frac{1}{\pi} \cdot \int_0^{\pi} v_{MQ}^2(\omega_e t) d(\omega_e t) = \frac{1}{\pi} \cdot \int_{\alpha}^{\pi-\alpha} V_p^2 [\sin(\omega_e t) - m_a]^2 d(\omega_e t) \qquad (11)$$

Simplifying the right side of equation (11), and then re-arranging terms on both the left and right side of equation (11) yields $$\eta = \frac{V_{MQ,RMS}^2}{V_P^2} = \frac{1}{\pi} \cdot \left[ (\pi - 2\alpha)\left(1 - \frac{\cos(2\alpha)}{2}\right) - \frac{3}{2}\sin(2\alpha) \right] \qquad (12)$$

where the conversion ratio $\eta = V_{MQ,RMS}^2/V_P^2$. Table 2 provides an exemplary look-up table showing values of ma and their corresponding conversion ratio $\eta$. Table 2 may serve as the foundation for the current estimation block shown in FIG. 3.

TABLE 2

| Look-up table showing relationship between the amplitude modulation ratio $m_a$, the diode's turn-on angle $\alpha$, and the conversion ratio $\eta$ | | |
|---|---|---|
| $m_a$ | $\alpha$ | $\eta$ |
| 0.000 | 0.0 | 0.50 |
| 0.041 | 2.3 | 0.45 |
| 0.084 | 4.8 | 0.40 |
| 0.131 | 7.5 | 0.35 |
| 0.182 | 10.5 | 0.30 |
| 0.239 | 13.8 | 0.25 |
| 0.303 | 17.6 | 0.20 |
| 0.378 | 22.2 | 0.15 |
| 0.470 | 28.1 | 0.10 |
| 0.598 | 36.7 | 0.05 |
| 1.000 | 90.0 | 0.00 |

From equation (10), the RMS current that flows through the diodes $D_5$ and $D_6$ is $$I_{MQ,RMS} = \frac{V_{MQ,RMS}}{R'_1 + R_2} \qquad (13)$$

Consequently, the step-up transformer's low-voltage winding's RMS current is $$I_1 = k_{th} \cdot I_{MQ,RMS} \cdot \frac{N_2}{N_1} \qquad (14)$$

where the factor $k_{th}$ is a coefficient greater than or equal to 1. This factor accounts for additional heating created by harmonics and other distortions in current. In practice, it is useful to start with $k_{th} = 1.00$ and try different values until one that matches the power quality condition of the low-voltage AC power supply $V_1$.

Table 2 shows an example of how to calculate RMS current in the step-up transformer's low-voltage winding $I_1$ from the measured medium-voltage DC link's voltage $V_{DC}$. In practice, it is useful to have a table with more rows than those in table 2 to help achieve better resolution. For example, the amplitude modulation ratio ma may be divided into 16, 32 or even 64 segments with corresponding conversion ratio $\eta$. Similar to those shown in table 2, all conversion ratios are pre-computed and stored in non-volatile memory.

When implementing the look-up table, there are optimized methods to locate a specific entry from the look-up table quickly. For example, a binary search algorithm may be used to reduce the total number of computations to find the location of a specific entry. The mathematical comparison may be replaced by fast and simple bitwise operations, which are directly supported by the microprocessors, to further increase the execution speed.

It is worth noting that in the subsequent thermal level estimation step, the RMS current $I_1$ is first squared, and then normalized to I2H according to equation (5). It is possible to reduce the total number of computations by combining equations (13) and (14)

$$I_1^2 = k_{th}^2 \cdot I_{MQ,RMS}^2 \cdot \left(\frac{N_2}{N_1}\right)^2 = \qquad (15)$$

$$k_{th}^2 \cdot \frac{V_{MQ,RMS}^2}{(R_1' + R_2)^2} \cdot \left(\frac{N_2}{N_1}\right)^2 = k_{th}^2 \cdot \left(\frac{N_2}{N_1}\right)^2 \cdot \frac{V_P^2}{(R_1' + R_2)^2} \cdot \eta$$

In equation (15), quantities $k_{th}^2$, $(N_2/N_1)^2$, $V_P^2$, $(R_1'+R_2)^2$ may be pre-computed and stored in a microprocessor's non-volatile memory. Once the conversion ratio is obtained from a look-up table similar to table 2 based on measured medium-voltage DC link's voltage $V_{DC}$, then $I_1^2$ is calculated according to equation (15). This $I_1^2$ may be used directly in the subsequent thermal level estimation block.

In summary, the current estimation block takes the measured medium-voltage DC link's voltage $V_{DC}$ as its input. Then it calculates the amplitude modulation ratio $m_a$ from this measured $V_{DC}$ and the highest peak voltage $V_P$. Next, the conversion ration is obtained from a pre-computed table that is similar to table 2. Finally, the RMS current in the step-up transformer's low-voltage winding $I_1$ is calculated from equations (13) and (14). To reduce the total number of computations, the current estimation block may also output $I_1^2$ in lieu of $I_1$ using equation (15).

For the step-up transformer, because a large amount of inrush current occurs within a short interval, the thermal behaviour of the step-up transformer's hot spot is largely determined by the localized thermal behaviour around the hot spot. In contrast, the step-up transformer's cooling behaviour involves not only the localized thermal behaviour around the hot spot, but also the overall thermal behaviour of the step-up transformer to dissipate the heat to the ambient surrounding.

Consequently, it is useful to use a thermal time constant $\tau_{th,H}$ (in seconds) to reflect the step-up transformer's heat-up behaviour, and a separate thermal time constant $\tau_{th,C}$ (in seconds) to describe the step-up transformer's cool-down behaviour.

Denoting $$\beta = 1/I_H^2,$$

then equation (5) may be rewritten as $$T_B(n) = \frac{\tau_{th,H}}{\tau_{th,H} + \Delta t} \cdot T_B(n-1) + \frac{\beta \cdot \Delta t}{\tau_{th,H} + \Delta t} \cdot I_1^2 \qquad (16)$$

When the time interval between discrete-time indices n and n−1, $\Delta t$, is a known quantity, then equation (16) is simplified to $$T_B(n) = a \cdot T_B(n-1) + b \cdot I_1^2 \qquad (17)$$

where $a = \tau_{th,H}/(\tau_{th,H} + \Delta t)$, and $b = \beta \cdot \Delta t/(\tau_{th,H} + \Delta t)$.

When the current estimation block produces a non-zero estimate of $I_1^2$, then equation (17) is applied to produce an estimated thermal level $T_B$. When the PRC is disconnected from the low-voltage AC power supply V1, either after the medium-voltage DC link reaches its pre-charge voltage level, or due to a DC pre-charge timeout function, the step-up transformer's cool-down behaviour is described by $$T_B(n) = \frac{\tau_{th,C}}{\tau_{th,C} + \Delta t} \cdot T_B(n-1) \qquad (18)$$

When the time interval between discrete-time indices n and n−1, $\Delta t$, is a known quantity, then equation (18) is simplified to $$T_B(n) = c \cdot T_B(n-1) \qquad (19)$$

where $c = \tau_{th,C}/(\tau_{th,C} + \Delta t)$.

When the PRC is disconnected from the low-voltage AC power supply $V_1$, then equation (19) is applied to produce an estimated thermal level $T_B$. This estimated thermal level $T_B$ is useful in determining whether the PRC has enough remaining thermal capacity for another pre-charge operation.

The thermal protection may work in conjunction with a DC pre-charge timeout function to provide comprehensive protection to the step-up transformer. The DC pre-charge timeout function determines the maximum duration to attempt a pre-charge. It disconnects the low-voltage AC power supply $V_1$ from the PRC after a pre-determined time has elapsed.

When the pre-determined time has not elapsed, the DC pre-charge timeout function does not activate. In this case, if the estimated thermal level TB is less than a pre-determined trip threshold $T_H$, e.g., $T_H$=100%, then no trip signal is generated. Otherwise, a trip signal is generated to disconnect the low-voltage AC power supply $V_1$ from the PRC.

In addition to the trip signal, an alarm signal may be generated when the thermal level $T_B$ is less than or equal to a pre-determined alarm threshold. The alarm threshold is usually set to a value less than the trip threshold $T_H$, e.g., 85%. Once the thermal level $T_B$ is equal to or greater than the alarm threshold, the protection logic generates an alarm to warn operators of potential pending thermal overload trip.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for providing thermal protection to a pre-charge unit (PRC) comprising a step-up transformer of an electric power conversion system with a DC link, comprising the steps of executing a parameter identification block identifying electrical and thermal parameters of the PRC;

executing a current estimation block estimating a current flowing through the step-up transformer of the PRC based on a voltage input;

executing a thermal level estimation block estimating a thermal level at the step-up transformer of the PRC based on the estimated current flowing through the step-up transformer of the PRC;

executing a protection logic block comparing the estimated thermal level to a pre-determined trip threshold to determine whether a thermal overload has occurred; and outputting a trip signal if the trip threshold has been exceeded.

2. The method according to claim 1, wherein the parameter identification block takes a voltage selection board rating $V_{SB}$, a low-voltage AC power supply nominal voltage $V_1$ in root-mean-square Volts and/or a low-voltage AC power supply nominal frequency $f_e$ in Hz as its input.

3. The method according to claim 2, wherein the parameter identification block produces a step-up transformer ratio $N_2/N_1$, a step-up transformer low-voltage winding resistance $R_1$ in $\Omega j$, a step-up transformer medium-voltage winding resistance $R_2$ in $\Omega$, a step-up transformer heat-up thermal time constant $\tau_{th,H}$ in seconds and/or a step-up transformer cool-down thermal time constant $\tau_{th,C}$ in seconds as its output.

4. The method according to claim 2, wherein the parameter identification block is executed once and/or that the current estimation block and/or the thermal level estimation block and/or the protection logic block are executed at fixed time intervals, at different time intervals and/or at varying time intervals.

5. The method according to claim 2, wherein the current estimation block and/or the thermal level estimation block and/or the protection logic block are executed at time intervals that are longer than a time period of a supply frequency at time intervals within a range of 25 ms to 500 ms.

6. The method according to claim 1, wherein the parameter identification block produces a step-up transformer ratio $N_2/N_1$, a step-up transformer low-voltage winding resistance $R_1$ in $\Omega j$, a step-up transformer medium-voltage winding resistance $R_2$ in $\Omega$, a step-up transformer heat-up thermal time constant $\tau_{th,H}$ in seconds and/or a step-up transformer cool-down thermal time constant $\tau_{th,C}$ in seconds as its output.

7. The method according to claim 6, wherein the parameter identification block is executed once and/or that the current estimation block and/or the thermal level estimation block and/or the protection logic block are executed at fixed time intervals, at different time intervals and/or at varying time intervals.

8. The method according to claim 6, wherein the current estimation block and/or the thermal level estimation block and/or the protection logic block are executed at time intervals that are longer than a time period of a supply frequency at time intervals within a range of 25 ms to 500 ms.

9. The method according to claim 1, wherein the parameter identification block is executed once and/or that the current estimation block and/or the thermal level estimation block and/or the protection logic block are executed at fixed time intervals, at different time intervals and/or at varying time intervals.

10. The method according to claim 9, wherein the current estimation block and/or the thermal level estimation block and/or the protection logic block are executed at time intervals that are longer than a time period of a supply frequency at time intervals within a range of 25 ms to 500 ms.

11. The method according to claim 1, wherein the current estimation block and/or the thermal level estimation block and/or the protection logic block are executed at time intervals that are longer than a time period of a supply frequency at time intervals within a range of 25 ms to 500 ms.

12. The method according to claim 1, wherein the current estimation block estimates current flowing through the step-up transformer of the PRC based on $V_{DC}$ voltage measurements at the DC link.

13. The method according to claim 1, wherein the current estimation block calculates an amplitude modulation ratio $m_a$ from measured $V_{DC}$ and a highest peak voltage $V_P$.

14. The method according to claim 1, wherein the current estimation block calculates an RMS current from:

$$I_1 = k_{th} \cdot I_{MQ,RMS} \cdot \frac{N_2}{N_1},$$

wherein $I_{MQ,RMS}$ is the RMS current flowing through diodes $D_5$ and $D_6$ of a PRC diode rectifier assembly derived from:

$$I_{MQ,RMS} = \frac{V_{MQ,RMS}}{R_1' + R_2},$$

wherein $V_{MQ,RMS}$ is an RMS voltage across diodes $D_5$ and $D_6$ of the PRC diode rectifier assembly derived from:

$$\eta = \frac{V_{MQ,RMS}^2}{V_P^2} = \frac{1}{\pi} \cdot \left[ (\pi - 2\alpha)\left(1 - \frac{\cos(2\alpha)}{2}\right) - \frac{3}{2}\sin(2\alpha) \right],$$

and wherein a diode turn-on angle $\alpha$ and conversion ratio $\eta$ are derived from a look-up table relating $\alpha$ and $\eta$ to an amplitude modulation ratio $m_a$.

15. The method according to claim 1, wherein a voltage sensor is the only sensor used for executing the method.

16. The method according to claim 1, wherein the trip threshold is pre-determined prior to the execution of the method and/or that the parameter identification block is executed once at a beginning of the method.

17. An electric power conversion system with a pre-charge unit (PRC) including a step-up transformer and a DC link for executing a method according to claim 1.

18. The method according to claim 1, wherein the electric power conversion system is a medium-voltage adjustable-speed drive.

19. The electric power conversion system according to claim 17, wherein the electric power conversion system is a medium-voltage adjustable-speed drive.

* * * * *